United States Patent
Cheuk et al.

(10) Patent No.: US 7,335,305 B2
(45) Date of Patent: Feb. 26, 2008

(54) SEQUENTIAL BATCH REACTOR AND WASTEWATER TREATMENT PROCESS

(75) Inventors: William Cheuk, Vancouver (CA); Anthony Lau, Vancouver (CA); Raymond Wong, Vancouver (CA); Peter Doig, Vancouver (CA); Bud Fraser, Vancouver (CA)

(73) Assignee: Vision Envirotech International Co. Ltd., Vancouver, British Columbia (CA)

( * ) Notice: Subject to any disclaimer, the term of this patent is extended or adjusted under 35 U.S.C. 154(b) by 76 days.

(21) Appl. No.: 11/342,824

(22) Filed: Jan. 31, 2006

(65) Prior Publication Data

US 2007/0175823 A1   Aug. 2, 2007

(51) Int. Cl.
  *C02F 3/00* (2006.01)
(52) U.S. Cl. .............. 210/620; 210/739; 210/150; 210/220
(58) Field of Classification Search .......... 210/739, 210/150, 620, 220
  See application file for complete search history.

(56) References Cited

U.S. PATENT DOCUMENTS 6,863,817 B2 *  3/2005  Liu et al. ............. 210/605

FOREIGN PATENT DOCUMENTS

| CA | 2041329 | 10/1992 |
|----|---------|---------|
| CA | 2061252 | 8/1993 |
| CA | 2322696 | 9/1999 |
| CA | 2464463 | 5/2003 |

OTHER PUBLICATIONS

P. Battistoni, An Automatically Controlled Alternate Oxic-Anoxic Process for Small Municipal Wastewater Treatment Plants, Ind. Eng. Chem. Res. 2003, 42, pp. 509-515.

* cited by examiner

*Primary Examiner*—Chester T. Barry
(74) *Attorney, Agent, or Firm*—Smiths IP; Paul Smith

(57) ABSTRACT

A system for controlling the aerobic phase of a wastewater treatment cycle in a sequencing batch reactor, comprising a tank, an air blower, at least one sensor for measuring the concentration of dissolved oxygen in the tank, and means to control the length of time that the air blower introduces air into the wastewater and to maintain at a constant level the volume of air introduced per time by the air blower. The length of time that the air blower introduces air is determined by the change in the slope of the curve representing the concentration of dissolved oxygen in the wastewater. The volume of air to be introduced per time by the air blower is determined based on the average concentration of dissolved oxygen from the previous wastewater treatment cycle.

16 Claims, 2 Drawing Sheets

SEQUENTIAL BATCH REACTOR AND WASTEWATER TREATMENT PROCESS

FIELD OF THE INVENTION

The present invention relates to the treatment of wastewater. More particularly it relates to a system for the biological treatment of municipal and industrial wastewater through the control of aerobic microbial processes.

BACKGROUND OF THE INVENTION

While water covers approximately two-thirds of the planet, most of this water is too salty to be of any use. As the demand for water continues to increase along with a growing world population, the treatment of wastewater has become ever more important.

Conventional biological wastewater treatment processes typically utilize an activated sludge configuration and incorporate at least two tanks: an activated sludge reactor and a secondary clarifier. This activated sludge process is used to treat organic carbon (e.g. measured as BOD, or biochemical oxygen demand) and suspended solids. The secondary clarifier is required in order to remove sludge and suspended solids.

To achieve advanced treatment of nutrients such as nitrogen and phosphorus, additional treatment phases must be incorporated. A conventional biological nutrient removal (BNR) plant may include an additional two to three tanks. Although this BNR configuration can provide advanced secondary wastewater treatment with nutrient removal, their large land footprint and high cost often prohibit their installation, especially in decentralized applications where sewer mains are not already established.

For larger wastewater treatment plants, energy costs are a major contributor to operation costs and can amount to many hundreds of thousands of dollars per year. For example, an average secondary activated sludge treatment plant uses about 65% of its energy consumption for aeration.

Sequencing Batch Reactor (SBR) technology improves upon other activated sludge biological wastewater treatment processes in terms of space and cost because all phases of the treatment process (such as anoxic treatment, aerobic treatment and settling) can be conducted in one tank. Secondary clarifiers are not required.

The SBR treatment sequence consists of a repeating cycle of treatment phases: fill, anoxic (optional), aerobic, settle, and decant.

SBR technology has reduced the land footprint and cost associated with conventional activated sludge processes. Nevertheless, one shortcoming of biological treatment processes that is inherent to both activated sludge and SBR processes at large is the lack of advanced process control. Conventional SBR process control typically includes presetting the length of the treatment phases (such as aerobic and anoxic phases) based on the operator's estimate of wastewater loading. This type of SBR operation is called fixed-time control. Because wastewater loading may be variable throughout the day, week or season, fixed-time control tends to either over-aerate or under-aerate the wastewater. Over-aeration leads to excessive energy consumption as well as compromised sludge performance. Under-aerated cycles do not fully treat the wastewater.

The use of real-time reactor monitoring, diagnostics and data collection considered 'advanced process control' is uncommon. Furthermore, many SBR systems do not use dissolved oxygen (DO) control for their processes, resulting in very limited control over anoxic and aerobic biological processes.

Although research and development on control of SBR aerobic phase treatment length using DO measurements in real-time ("real-time control") has been studied in the lab and in pilot-scale reactors, this research has not been widely commercialized. For example, a study by Battistoni et al., (Ind. Eng. Chem. Res., 2003, 4:509-515), at the University of Ancona in Italy used a patented (Battistoni, P., Italian Patent No. NR99A000018, 1999) process controller which interprets ORP and DO signals to control the aeration in a small extended aeration wastewater treatment plant. The paper claims that the controller uses DO detection of the ammonia elbow to control the aeration cycle length. This technology differs from the present technology in that it does not contain automatic DO calibration and real-time airflow control. Without automatic DO sensor calibration, the real-time DO measurements may not be accurate thus limiting the effectiveness of the overall process to only those situations in which the DO sensors are manually calibrated. Without real-time airflow control, it is questionable if the DO of the system can be kept within the specific range (as in the present invention) known to consistently detect the ammonia elbow in the DO profile and to ensure complete nitrification and treatment. Accordingly, the results showed that complete nitrification (ammonia removal) was inconsistent.

Other companies, for example Ondeo Services located in Australia, have commercialized technology which applies the use of other sensor parameters. Ondeo Services OGAR® (Optimized manaGement of Aeration by Redox) process control technology uses oxidation reduction potential (ORP) to control nitrification (conversion of ammonia to nitrate) and to control the aeration length.

SUMMARY OF THE INVENTION

The present invention comprises an improved SBR wastewater treatment system utilizing advanced process control. Advanced process control allows the SBR treatment process to achieve not only removal of organic carbon and suspended solids, but also to enhance biological nutrient removal. In addition, it provides significantly improved energy efficiency. The present invention uses a "real-time" process control method for aerobic treatment phase length and airflow control for optimized wastewater treatment. A high rate of accuracy and precision is assisted by a unique DO sensor calibration method.

According to an embodiment of the invention there is provided a system for controlling the aerobic phase of a wastewater treatment cycle, with at least two cycles, for a sequencing batch reactor comprising a tank for holding wastewater to be treated, an air blower located in the tank for introducing air into the wastewater being treated, at least one sensor located inside the tank for measuring the concentration of dissolved oxygen in the wastewater being treated, a means to control the length of time that the air blower introduces air into the wastewater being treated, and a means to maintain at a constant level the volume of air introduced per time by the air blower into the wastewater being treated.

In another embodiment of the present invention, the means to control the length of time that the air blower introduces air comprises a programmable logic controller for determining from the at least one sensor the concentration of dissolved oxygen in the wastewater being treated at predetermined time intervals, for determining when the change in the slope of the curve representing the concentration of dissolved oxygen in the wastewater being treated exceeds a predetermined set point value, and for discontinuing the air blower when the predetermined set point value is reached.

In yet another embodiment of the present invention, the means to maintain at a constant level the volume of air introduced per time by the air blower comprises a programmable logic controller for determining the at least one sensor an average concentration of dissolved oxygen in the wastewater being treated during the aerobic phase from the previous wastewater treatment cycle and for inputting the average concentration of dissolved oxygen into a proportional integral derivative algorithm to determine a volume of air to be introduced per time by the air blower during the aerobic phase of the current wastewater treatment cycle.

In an embodiment of the present invention, there is provided a method for controlling the aerobic phase of a wastewater treatment cycle with at least two cycles for a sequencing batch reactor, comprising the steps of filling a tank with wastewater to be treated; introducing air through an air blower into the wastewater being treated; maintaining at a constant level the volume of air introduced by said air blower per time into the wastewater being treated; measuring the concentration of dissolved oxygen at predetermined time intervals in the wastewater to be treated using at least one sensor; measuring the average concentration of dissolved oxygen in the wastewater being treated using said at least one sensor; determining the volume of air to be introduced per time by the air blower by inputting the average concentration of dissolved oxygen in the wastewater being treated during the aerobic phase of the previous wastewater treatment cycle by inputting said average concentration of dissolved oxygen into a proportional integral derivative algorithm to determine a volume of air to be introduced per time by the air blower during the aerobic phase of the current wastewater treatment cycle; discontinuing the introduction of air through the air blower when the change in the slope of the curve representing the concentration of dissolved oxygen in the wastewater being treated exceeds a predetermined set point value; and releasing from the tank the treated wastewater.

In still another embodiment of the present invention, there is further provided the step of calibrating the first sensor and the second sensor, wherein the step of calibrating the first sensor and the second sensor comprises the steps of calibrating the first sensor based on standard air oxygen calibration values when the first sensor is exposed to air, and calibrating the second sensor to the first sensor when both sensors are submerged in wastewater to be treated during the aerobic phase of the subsequent treatment cycle.

The foregoing was intended as a broad summary only and of only some of the aspects of the invention. It was not intended to define the limits or requirements of the invention. Other aspects of the invention will be appreciated by reference to the detailed description of the preferred embodiment and to the claims.

BRIEF DESCRIPTION OF THE DRAWINGS

These and other features of the invention will become more apparent from the following description in which reference is made to the appended drawings and wherein.

DETAILED DESCRIPTION OF THE PREFERRED EMBODIMENT

Figure 1:
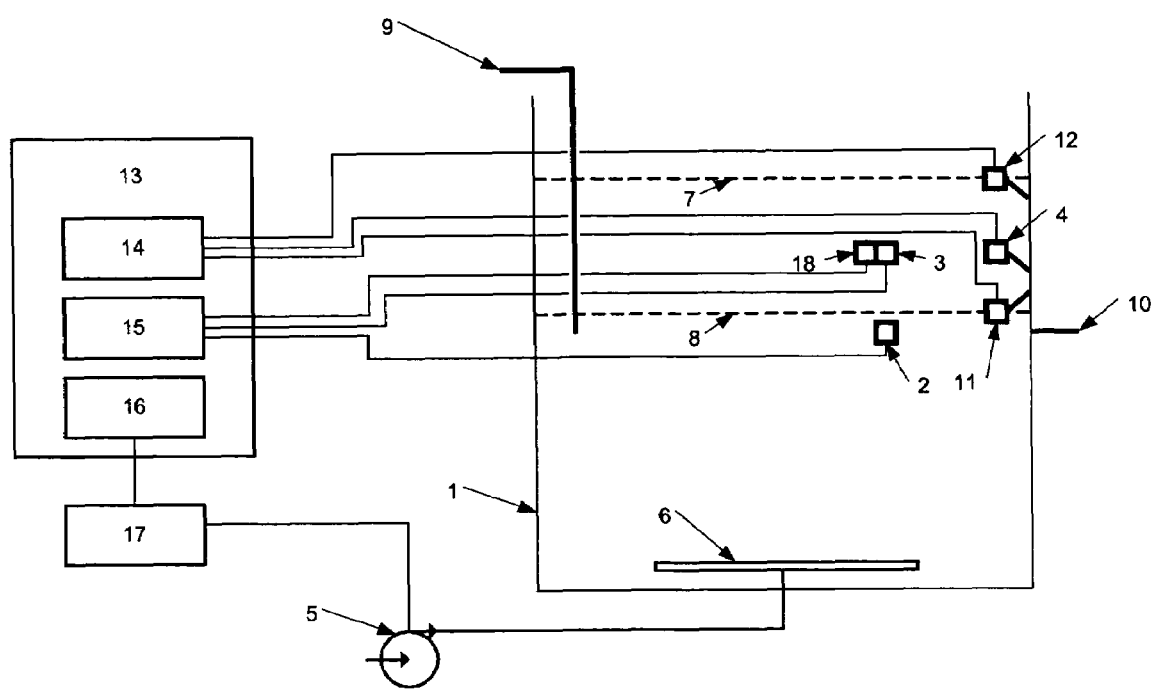
FIG. 1 is a schematic representation of the system according to the present invention.

The preferred embodiment of an improved SBR wastewater treatment system according to the invention is generally illustrated in FIG. 1.

Equipment

During the fill phase, wastewater to be treated is placed in a tank 1 having a high water level 7 and a low water level 8. The high water level 7 is located at the height at which the tank 1 is at maximum capacity. After the tank 1 is decanted (i.e. the clarified liquid removed), the water is at the low water level 8. The tank 1 is equipped with an inlet 9 through which wastewater enters the tank 1 and an outlet 10 through which effluent exits the tank 1. An upper DO sensor float switch 4 mounted in tank 1 monitors the level of wastewater in the tank 1. A low level float switch 11, a high level float switch 12, a lower DO sensor 2, and an upper DO sensor 3 are also installed in the tank 1. When the water reaches the upper DO sensor float switch 4 during filling, a signal is sent to the programmable logic controller (PLC) 13 that the water level is higher than the upper DO sensor 3. The lower DO sensor 2 and upper DO sensor 3 are adapted to sense the level of dissolved oxygen in the surrounding water or air. The lower DO sensor 2 is mounted in the tank 1 below the low water level 8, while the upper DO sensor 3 is mounted in the tank 1 between the low water level 8 and the high water level 7. An air diffuser 6 is installed near the bottom of the tank 1 and is connected to an air blower 5.

The PLC 13 is equipped with a digital input module 14, an analog input module 15 and an analog output module 16. The lower DO sensor 2 and upper DO sensor 3 are connected to the analog input module 15. The upper DO sensor float switch 4, the low level float switch 11, and the high level float switch 12 are connected to the digital input module 14. The air blower 5 is connected to a blower speed controller 17, which is in turn connected to the analog output module 16.

Operation of the Process

Wastewater enters the tank 1 through the inlet 9 until either the wastewater level reaches the high water level 7 (as detected by the high level float switch 12) or the supply of wastewater is exhausted (when a preset timer in the PLC 13 expires). Once the tank 1 has been filled with the wastewater to be treated, an optional anoxic treatment phase commences if the operator has enabled the anoxic phase option in the PLC 13. During this optional anoxic phase, the wastewater is not aerated. After the anoxic phase (if any) has been completed, the aerobic treatment phase commences. During the aerobic phase, air from the air blower 5 is blown through the air diffuser 6 into the wastewater in the tank 1. The amount of air outputted by the air blower 5 is controlled by the blower speed controller 17, based on signals sent to it by the PLC 13 via the analog output module 16.

The length of the aerobic phase of the treatment cycle is controlled as follows. The DO level in the tank 1 is continuously monitored by the PLC 13 based on the readings from the lower DO sensor 2 and the upper DO sensor 3. The DO level is calculated from the two sensors as follows. If there are no errors detected on the sensors by the PLC 13, the DO level is calculated by averaging the DO readings from the lower DO sensor 2 and the upper DO sensor 3. If the upper DO sensor 3 remains in the air (i.e. above the water level) during the aerobic phase, as determined by the upper DO sensor float switch 4, the DO level will be calculated from the lower DO sensor 2 only. If an error such as an out-of-range signal is detected from one sensor, the DO level will be based on the other sensor. Application software installed in the PLC 13 calculates the change in the slope of the DO curve at configurable time intervals. This slope change is calculated by measuring the slope at two consecutive time intervals and subtracting the slope of the first interval from the second. The length of the time intervals is set in the PLC 13 by the system installer and may range from 5 minutes to 30 minutes. This length may be adjusted as desired. When the slope change exceeds a configurable set point value, a bending point in the DO curve is reached, which corresponds to the end of the ammonia nitrification reaction. At this point, all of the ammonia has been converted to nitrate. For the majority of wastewater types, the BOD has also already been treated to the fullest extent possible at some time prior to this point. This set point value is configured by the system installer and may be adjusted later by system maintenance personnel based on system performance. The aerobic phase is then completed and the air from the air blower 5 is turned off through signals from the analog output module 16 of PLC 13 to the blower speed controller 17.

The airflow rate (e.g. volume of air introduced per time) during the aerobic treatment phase is controlled as follows. During the aerobic phase, the DO level is sampled by the PLC 13 once per minute and a running average DO value is calculated based on these samples. At the end of the aeration phase, the resulting average DO, along with the configured DO set point value, is input to a Proportional Integral Derivative (PID) algorithm in the PLC 13 that is configured to run a single iteration. The PID algorithm is an industry standard formula that is built in to the PLC 13, and many other control systems, for closed-loop control. Each PID implementation varies due to the tuning of the PID control parameters performed by the system engineer prior to system startup. The PID algorithm calculates a new output value that is used to set the airflow rate for the next cycle of the aerobic treatment phase. This process repeats once each aerobic phase. The PLC 13 sets the airflow rate by outputting a value from the analog output module 16 to the blower speed controller 17.

The airflow rate is adjusted just once during each treatment cycle in between aeration phases. This once-per-cycle, or cyclic, airflow rate control is essential to the real-time control process as it allows airflow rate control to operate without interfering with the detection of the DO curve bending point. In contrast, if the airflow rate were to be adjusted during the aerobic phase to achieve a DO set point (as in conventional DO control), bending points in the DO curve induced by airflow changes would falsely trigger the detection of the end of nitrification and prematurely terminate the aerobic cycle. In the SBR context, this cyclic method of airflow control improves upon conventional DO control in that it exploits the natural tendency of biological systems, including activated sludge systems, to self-regulate or become homeostatic with their environment, and in turn "control" the DO. This then enables the monitoring system and the operator to clearly observe important biologically-induced changes during the treatment process, without interference from the control system.

In some systems, there is no automatic control of airflow or DO. In this case, detection of the end of nitrification becomes difficult or impossible, as the magnitude of the DO bending point is affected by the DO level and rate of increase (slope). Therefore, cyclic airflow control is necessary for reliable operation of real-time aeration phase control.

Following completion of the aerobic cycle, a settling phase is started that allows the sludge to settle. During this period there is no aeration. The settling phase continues until a preset timer in the PLC 13 expires. The preset timer value is set by the installer and may be modified by the operator, and may be in the range of 15 minutes to 4 hours.

Following the settling phase, the outlet 10 is opened, allowing the clarified effluent to discharge from the tank 1. The discharge continues until the water level reaches the low water level 8, as determined by the low level float switch 11. At this point, the outlet 10 is closed and the treatment cycle is repeated, starting from the fill phase.

The discharged effluent is characterized by low suspended solids, low BOD, low nutrient concentrations (including ammonia, nitrate, total nitrogen and phosphorous), reduced odour, and reduced turbidity.

Sensor Calibration

DO sensing and signal interpretation is a central component of the invention; likewise, DO sensor calibration is essential to ensure accurate measurements and consistency for both the real-time aeration phase length control and the cyclic airflow rate control.

The lower DO sensor 2 and the upper DO sensor 3 are positioned as discussed above in order to provide for proper calibration of the system. The upper DO sensor float switch 4 confirms that the upper DO sensor 3 is submerged after the filling phase. When treated wastewater is released through outlet 10, upper DO sensor 3 becomes exposed to air. After the upper DO sensor 3 has been exposed to air during decanting for a period of at least 10 minutes, the air temperature is taken from a temperature sensor at the same location, and the calibration of the upper DO sensor 3 is checked using standard air oxygen calibration values from a table stored in the PLC 13. A software calibration value is determined to recalibrate the upper sensor based on the air oxygen reading and the air oxygen calibration value. The software calibration factor is determined by dividing the air oxygen calibration value by the apparent air oxygen value measured from the upper DO sensor 3. During the next aerobic phase, the reading of the upper DO sensor 3 is compared to that of the lower DO sensor 2, and the lower sensor is recalibrated in the software of the PLC 13 if necessary so that the two sensors provide the same reading. If, when comparing the two sensors, the difference in DO readings is greater than a set margin, the PLC 13 generates an alarm, indicating to operations and maintenance personnel that there is a calibration problem with the sensors and that servicing may be required. The margin is configured by the installer, may be adjusted by maintenance personnel, and may be in the range of 5% to 30% of the higher sensor reading at the time of comparison.

Figure 2:
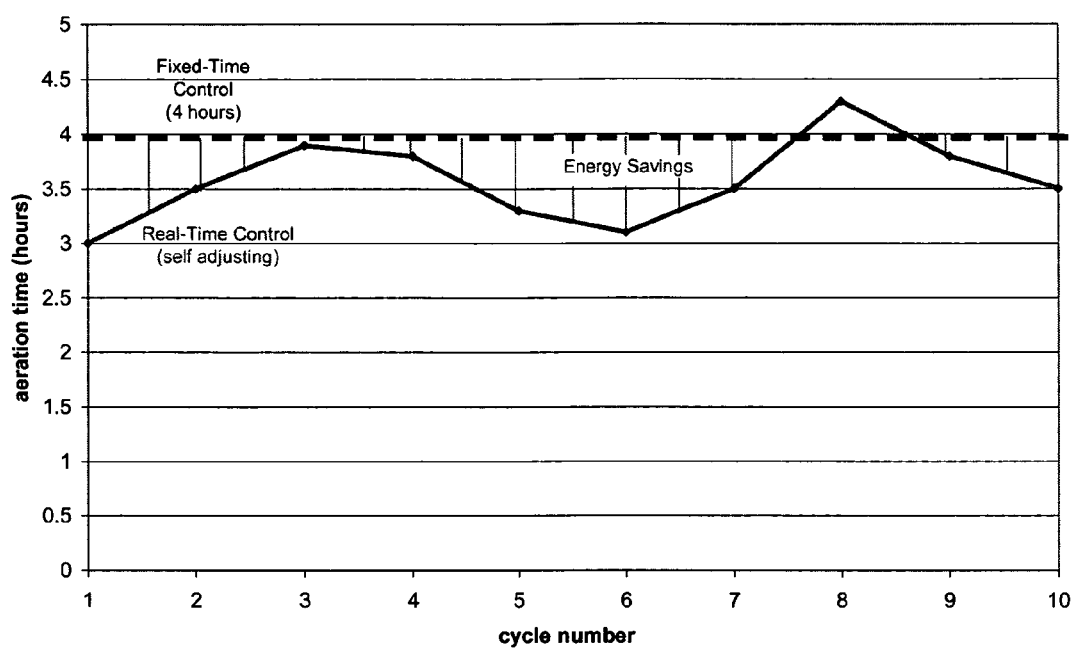
FIG. 2 is a graph depicting the energy savings from the use of present invention over prior art systems.

Using real-time control of the aeration phase length, energy consumption is reduced. A typical example of the energy savings of using real-time control, as opposed to the fixed-time control, is shown in FIG. 2.

This energy savings is achieved primarily through three mechanisms. First, aeration is used only when needed, as the real-time control system terminates the aerobic treatment phase at a point when the wastewater has been fully treated. In contrast, a conventional SBR uses a preset aerobic cycle time based on the operator's estimation; this fixed-time aeration phase does not change or react to variable loading. As a result, when influent wastewater BOD and nutrient concentrations are lower, the conventional SBR over-aerates and wastes energy. In contrast, with real-time control: the greater the influent loading variations, the greater the potential energy savings.

Second, by using cyclic airflow rate control, the dissolved oxygen (DO) concentration is maintained lower (typically in the range 0.7 to 1.0 mg/L) than that of conventional systems and is prevented from escalating excessively when the oxygen demand decreases. The lower overall DO concentrations result in a higher oxygen transfer efficiency, reducing the required amount of oxygen (and consequently energy) input.

Third, oxygen introduced through aeration is "recycled" through the denitrification process, and during simultaneous nitrification and denitrification (SND), which occurs during the aerobic phase. Typically, SND does not occur in most SBR systems, which are often over-aerated. During SND, ammonia is nitrified to nitrite/nitrate and nitrite/nitrate is denitrified to nitrogenous gases, removing nitrogen from the wastewater. Oxygen incorporated in the nitrification of ammonia to nitrite/nitrate can be re-utilized by the sludge in the oxidation of organic compounds since nitrates can act as electron acceptors in place of oxygen, reducing the demand for oxygen addition by aeration.

In terms of treatment performance, real-time aeration phase control, in combination with cyclic airflow rate control, provides finer control of biological conditions within the treatment reactor by optimizing the length of the aerobic treatment phase to avoid under- and over-aeration of the sludge and allowing the sludge to self-regulate to maximize metabolic potential. This maintains consistent conditions from one cycle to the next, even during variable loading, allowing the sludge to perform consistently and maintain nutrient removal efficiency without disruption. Nutrient removal performance compares favorably with other BNR systems that are larger, more complex and more expensive. Effluent ammonia concentration is virtually zero, due to the detection of the completion of the ammonia nitrification reaction.

It will be appreciated by those skilled in the art that the preferred and alternative embodiments have been described in some detail but that certain modifications may be practiced without departing from the principles of the invention.

What is claimed is:

1. A system for controlling the aerobic phase of a wastewater treatment cycle with at least two cycles for a sequencing batch reactor, comprising:
   a tank for holding wastewater to be treated,
   an air blower located in said tank for introducing air into the wastewater being treated,
   at least two sensors located inside said tank for measuring the concentration of dissolved oxygen in the wastewater being treated, wherein said at least two sensors comprises a first sensor and a second sensor, wherein said first sensor is located above said second sensor,
   a means to control the length of time that said air blower introduces air into the wastewater being treated, and
   a means to maintain at a constant level the volume of air introduced per time by said air blower into the wastewater being treated.

2. The system of claim 1, wherein said means to control the length of time that said air blower introduces air comprises a programmable logic controller for determining from said at least two sensors the concentration of dissolved oxygen in the wastewater being treated at predetermined time intervals, for determining when the change in the slope of the curve representing the concentration of dissolved oxygen in the wastewater being treated exceeds a predetermined set point value, and for discontinuing said air blower when said predetermined set point value is reached.

3. The system of claim 1, wherein said means to maintain at a constant level the volume of air introduced per time by said air blower comprises a programmable logic controller for determining from said at least two sensors an average concentration of dissolved oxygen in the wastewater being treated during the aerobic phase from the previous wastewater treatment cycle and for inputting said average concentration of dissolved oxygen into a proportional integral derivative algorithm to determine a volume of air to be introduced per time by said air blower during the aerobic phase of the current wastewater treatment cycle.

4. The system of claim 1 further comprising an upper float switch located in said tank and a lower float switch located in said tank, wherein said upper float switch is located above said first sensor, said first sensor is located above said lower float switch, and said lower float switch is located above said second sensor.

5. The system of claim 4 wherein said upper float switch is tripped when the level of wastewater being treated in said tank rises above the level of said upper float switch and said lower float switch is tripped when the level of wastewater being treated in said tank falls below the level of said lower float switch.

6. The system of claim 5 wherein said tank is adapted to cease allowing ingress of wastewater to be treated when said upper float switch is tripped.

7. The system of claim 5 wherein said tank is adapted to cease allowing egress of wastewater after treatment when said lower float switch is tripped.

8. The system of claim 1 further comprising a sensor float switch located in said tank at the same vertical level as the first sensor, wherein said sensor float switch is adapted to be tripped when the level of wastewater being treated in said tank falls below the level of said sensor float switch.

9. The system of claim 1 wherein said first and second sensors are calibratable.

10. A method for controlling the aerobic phase of a wastewater treatment cycle with at least two cycles for a sequencing batch reactor, comprising the steps of:
    filling a tank with wastewater to be treated;
    introducing air through an air blower into the wastewater being treated;
    maintaining at a constant level the volume of air introduced by said air blower per time into the wastewater being treated;
    measuring the concentration of dissolved oxygen at predetermined time intervals in the wastewater to be treated using at least one sensor;
    measuring the average concentration of dissolved oxygen in the wastewater being treated using said at least one sensor;
    determining the volume of air to be introduced, per time by said air blower by inputting the average concentration of dissolved oxygen in the wastewater being treated during the aerobic phase of the previous wastewater treatment cycle by inputting said average concentration of dissolved oxygen into a proportional integral derivative algorithm to determine a volume of air to be introduced per time by said air blower during the aerobic phase of the current wastewater treatment cycle;
    discontinuing the introduction of air through said air blower when the change in the slope of the curve representing the concentration of dissolved oxygen in the wastewater being treated exceeds a predetermined set point value, and releasing from said tank the treated wastewater.

11. The method of claim 10 wherein said step of filling said tank with wastewater to be treated continues until the level of wastewater in said tank rises above the level of an upper float switch located in said tank.

12. The method of claim 10 wherein said step of releasing from said tank the treated wastewater continues until the level of wastewater in said tank falls below the level of a lower float switch located in said tank.

13. The method of claim 10 wherein said step of measuring the concentration of dissolved oxygen at predetermined time intervals in the wastewater to be treated uses a first sensor and a second sensor, wherein said first sensor is located in said tank above said second sensor.

14. The method of claim 13 further comprising the step of calibrating said first sensor and said second sensor, wherein said step of calibrating said first sensor and said second sensor comprises the steps of calibrating said first sensor based on standard air oxygen calibration values when said first sensor is exposed to air, and calibrating said second sensor to said first sensor when both sensors are submerged in wastewater to be treated during the aerobic phase of the subsequent treatment cycle.

15. The method of claim 14 wherein said step of calibrating said first sensor occurs when the level of wastewater to be treated in said tank falls below the level of a sensor float switch located in said tank at the same level as said first sensor.

16. The method of claim 14 further comprising the step of transmitting a warning when the difference in calibration between said first sensor and said second sensor is outside of a predetermined range.

* * * * *